United States Patent [19]

Kollmann

[11] Patent Number: 5,257,588
[45] Date of Patent: Nov. 2, 1993

[54] METHOD FOR THE ABATEMENT OF FLUE GAS FROM A PROCESS OF COMBUSTION, MORE PARTICULARLY A REFUSE INCINERATING PLANT

[76] Inventor: Hermann Kollmann, Moniberg 3, 8300 Landshut, Fed. Rep. of Germany

[21] Appl. No.: 827,736

[22] Filed: Jan. 29, 1992

[30] Foreign Application Priority Data

Jan. 30, 1991 [EP] European Pat. Off. ........ 91101194.8

[51] Int. Cl.⁵ ........................ F23J 11/00; F23J 15/00
[52] U.S. Cl. .................................. 110/345; 110/215; 422/168
[58] Field of Search .............. 110/347, 344, 345, 215; 423/358, DIG. 17, DIG. 18; 422/168

[56] References Cited

U.S. PATENT DOCUMENTS

| | | | |
|---|---|---|---|
| 4,294,812 | 10/1981 | Oler | 423/357 |
| 4,652,678 | 3/1987 | Douwes | 423/358 X |
| 4,726,302 | 2/1988 | Hein et al. | 110/345 |
| 4,782,771 | 11/1988 | Bergkvist | 110/345 |
| 5,029,535 | 7/1991 | Krigman et al. | 110/345 |

FOREIGN PATENT DOCUMENTS 2230008 9/1990 Japan .

Primary Examiner—Edward G. Favors
Attorney, Agent, or Firm—Anderson Kill Olick & Oshinsky

[57] ABSTRACT

The invention relates to a method of flue gas abatement for a combustion process, particularly for a refuse incinerating unit, in the case of which ammonia in a gaseous form or dissolved in water is fed into the combustion process or hot flue gases therefrom and furthermore preferably acidic components are removed by scrubbing from the flue gases and are neutralized by a basic material, to which milk of lime has been added, and furthermore the flue gases may be passed in addition though adsorbing materials and if necessary basic materials are supplied to the process so that nitrogen oxides, hydrogen chloride in gas form, dioxines and furans are removed. The material necessary for this are taken from a local sewage plant where they at least proportionately form partial streams in a sludge treatment unit and otherwise would have to be dispensed with.

7 Claims, 2 Drawing Sheets

METHOD FOR THE ABATEMENT OF FLUE GAS FROM A PROCESS OF COMBUSTION, MORE PARTICULARLY A REFUSE INCINERATING PLANT

The invention relates to a method for the abatement of flue gases from a process of combustion, e.g. and particularly of a refuse incinerating plant, in the case of which process ammonia or ammonium ions are supplied to the process of combustion, and possibly acidic components are removed from the gases of combustion by scrubbing and are neutralized by basic media, to which milk of lime has been added, and/or basic media are introduced into the combustion zone.

In the case of large scale combustion systems and more particularly in the case of refuse incinerating plants, distillation gas burners etc. noxious substances are produced in the form of oxides of nitrogen ($NO_x$), and furthermore inter alia hydrogen chloride (HCl), sulfur dioxide ($SO_2$) and polychlorinated dioxines and furans. In order to free the flue gases from these noxious substances various techniques have been developed. For instance, the oxides of nitrogen may be reduced by the introduction of ammonia into the combustion zone, that is to say by mixing it with the combustion air or the flue gases or furthermore by spraying liquid $NH_3$ into the combustion zone. In this respect it is known as well (see German patent publication 3,702,107 A) to obtain such ammonia from waste water rich in N salts and S salts downstream from combined $SO_2$ and $NO_x$ scrubbing units. In ammonia ($NH_3$) the nitrogen atom is electrically negative and in the oxides of nitrogen the nitrogen atom is electrically positive. At 600° C. to 800° C. these substance react with the formation of elementary nitrogen ($N_2$), water vapor and possibly further residual gases as well.

Hydrogen chloride, which is produced in large quantities in incinerating plants owing to the large amounts of polyvinyl chloride burnt, may be washed out using basic washing water, to which milk of lime ($Ca(OH)_2$) or, for dealing with $SO_2$, caustic soda (NaOH) has been added; and the dioxines and furans in fact are adsorbable substances, which are filtered out by adding adsorbents, that is to say suspended active carbon, to the scrubbing water. Furthermore ammonia impedes catalytic formation of dioxines, for which purpose a chemical modification of the $CuCl_2$ catalyst may be responsible. It is a known practice to use liquid manure in incinerating plant in order in this manner to reduce the oxides of nitrogen and to adsorb a part of the dioxines and the furans However this does not mean that the scrubbing of the flue gases is then superfluous.

The supply of the different substances necessary for scrubbing flue gases, the non-catalytic reduction of nitrogen oxides and the adsorption of noxious substance in large quantities leads to an undesired amount of complexity. There has been a proposal, see the German patent publication 2,709,231 A, to sprinkle alkaline waste liquor onto a tower packing absorber, into which the flue gases are caused to flow so that there is a substantial mutual neutralization. In the case of another known method, see the European patent publication 123,856 A, removal or isolation of noxious substances in waste gases is performed by bringing them into contact with an aqueous suspension of binding materials, which consists of sewage sludge and more particularly of such a sludge mixed with Autumn leaves.

One object of the present invention is to simplify the preparation of such substances As regards the elimination of nitrogen oxides this is obtained in accordance with the invention by introducing the ammonia originating from sludge processing in communal sewage works is introduced into the combustion zone. Such method may be further developed by the basic media being at least proportionally from partial streams produced in sludge treatment in communal sewage works, which are processed with milk of lime, and/or if basic media are introduced into the combustion zone, by utilizing dewatered sewage sludge treated with milk of lime for this purpose.

In communal sewage treatment works it is conventional to improve the degree to which water may be removed from sewage sludge by the addition of milk of lime In parts of the flowing sludge undergoing treatment high concentrations of ammonium and ammonia occur. In accordance with prior art the ammonia may be expelled by the injection of air and may be neutralized by acidic washing solutions. In accordance with the invention the high ammonia content of waters and sludges produced in sewage works, which in accordance the with prior art has been responsible for abatement problems, is utilized in order to abate flue gases. Therefore in place of producing ammonia for the particular purpose of abating flue gases and having to adopt particular measures for dispensing with the ammonia of the sewage works, this substance occurring in any case in the treatment of sewage is utilized for flue gas abatement.

Preferably additionally the highly basic character of such liquors and sludges mixed with milk of lime is taken advantage of. It is an advantage in this respect to use parts of the flow in a sludge digesting tower and more particularly the supernatant water, which collects over the sludge settling bottom, and the water produced by dewatering the sludge. In this respect it is a question of water which is turbid and contains a large quantity of suspended materials. However prior to settling or dewatering by expression milk of lime is added to the sludge in a quantity of approximately, for instance, 300 g $Ca(OH)_2$ per kilogram of dry matter. The water resulting from dewatering the sludge consequently has a high content of $Ca(OH)_2$. It is hence highly basic and has a pH value of the order of 12. Such liquors are drawn off and may be preferably used as a mixture.

The substance produced in this manner is, in accordance with a preferred form of the process, conveyed to the refuse incineration plant where firstly the ammonia is driven off and introduced into the combustion zone; the basic water is then introduced into a gas scrubbing unit or a neutralizing unit following a gas scrubbing unit and is used as a basic medium with or without suspended materials. Owing to the amount of lime the hydrogen chloride is scrubbed from the flue gases and/or washed out hydrochloric acid is neutralized, and the suspended materials contained in the scrubbing water act as adsorbents, with which further noxious substances, more particularly polychlorinated dioxines and polychlorinated furans undergo an addition reaction.

Owing to addition of limed, dewatered digested sludge to the material to be burnt in the refuse incinerating plant chlorine liberated by the combustion of chlorine containing substances is bound even at the site where it is released, that is to say in the combustion zone, and is no longer available for renewed synthesis or for increasing the chlorine content of dioxines and furans.

Further advantageous developments and convenient forms of the invention will be gathered from the following detailed account of preferred embodiments thereof in conjunction with the accompanying drawings.

Figure 1:
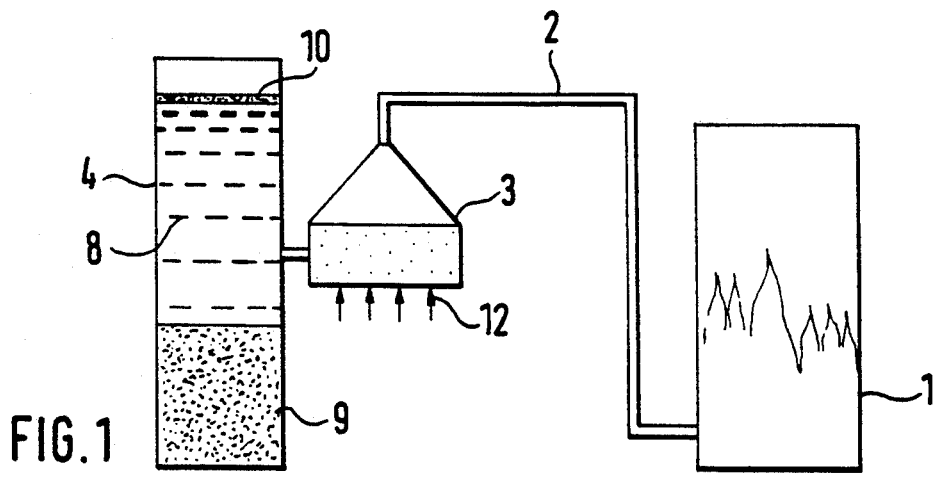
FIGS. 1 and 2 are diagrams of processes using ammonia from a digesting tower for a refuse incinerating pant.

In FIG. 1, via a pipe 2 a heating boiler 1 of a refuse incinerating unit is supplied with gas which contains a substantial quantity of ammonia and which in the boiler converts nitrogen oxides, which result from combustion, directly into non-noxious products and checks the formation of dioxines and furans. The pipe 2 comes from an ammonia expelling unit 3, which is fed with turbid water, that is to say supernatant water 8 from a digesting tower 4. In the digesting tower 4 digested sludge 9 settles at the bottom, while above it there is the supernatant water 8, whose surface is covered by a layer of floating sludge 10. The supernatant water 8 contains not only numerous suspended substances but furthermore has a high ammonia and ammonium content as well and the ammonia is driven off in the expelling unit 3 by blowing in air 12.

Figure 2:
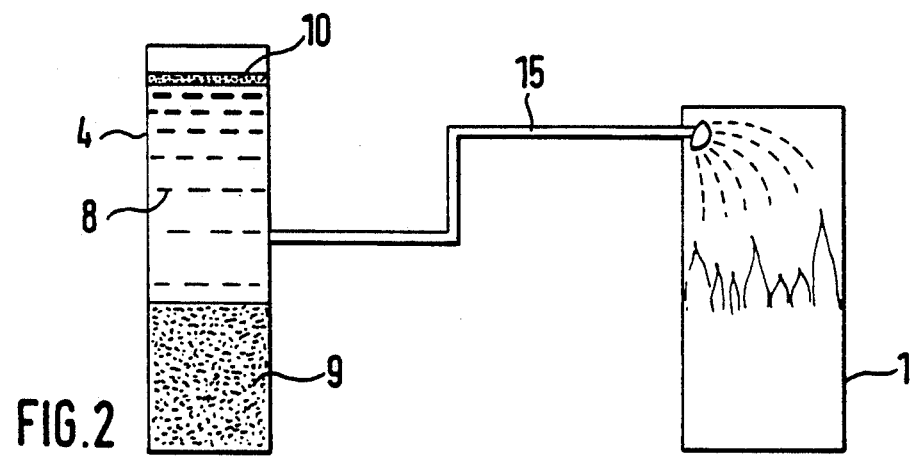

In accordance with FIG. 2 the supernatant water 8 is drawn off and passed and sprayed directly into the heating boiler 1 via a pipe 15. This effect is generally similar to the effect of the method in accordance with FIG. 1.

Figure 3:
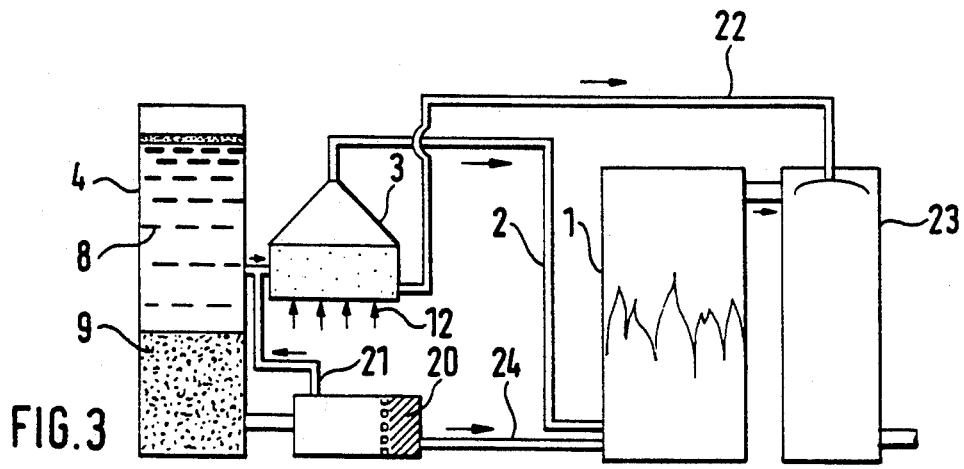
FIG. 3 is a diagram of a method in accordance with FIG. 1 with the additional utilization of water from a dewatering unit for digested sludge treated with milk of lime for the basic flue gas scrubbing and of dewatered sludge added to the combustion zone.

In accordance with FIG. 3 the measures of FIG. 1 are supplemented by three additional ones.

The first additional measure is the mixing of the water from the dewatering of the digested sludge with the supernatant water from the digesting tower. The sludge from the digesting tower is fed into a dewatering unit 20 as digested sludge after digestion, such unit being illustrated as a filter press, but however other types of dewatering units are possible, as for instance those with centrifuges or based on separation by gravity. The separate water is substantially free of suspended substances, but it has a high content of $Ca(OH)_2$. It is fed via a pipe 21 into the supernatant water drawn off from the digesting tower 4.

The second supplementary measure is that aqueous mixture from the ammonia expelling unit is fed as scrubbing water via a pipe 22 to a flue gas scrubber 23, where the basic substances which more particularly result from the treatment of the sludge neutralize the trapped hydrochloric acid.

In accordance with the third supplementary measure substantially dewatered sludge treated with lime which renders it basic is fed via a path 24 to the material to be burned, where a part of the chlorine is bound at once, such chlorine originating more particularly from the combustion of PVC.

Figure 4:
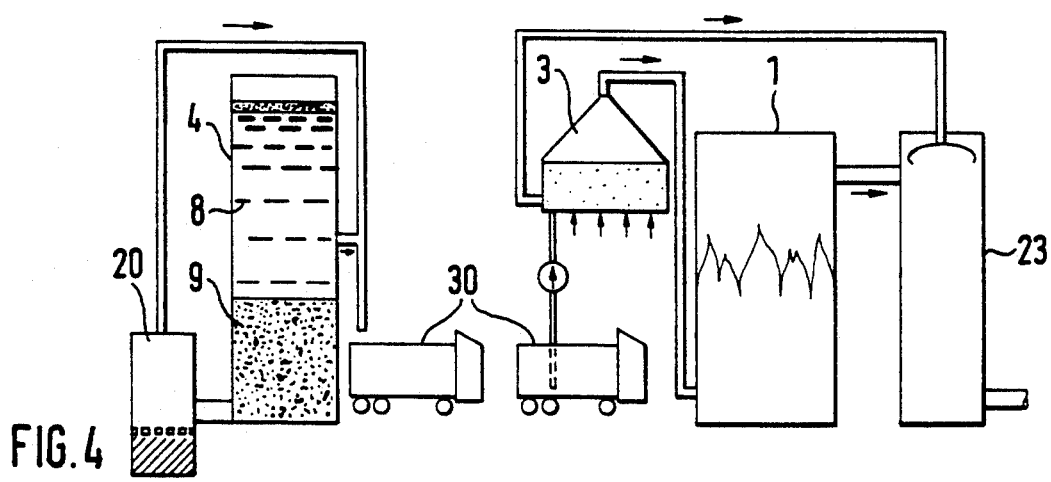
FIGS. 4 and 5 are diagrams of methods using both principles as illustrated in FIGS. 1 through 3.

FIG. 4 shows the measures in accordance with FIG. 3 without a pipe connection between the sewage abatement station and the refuse incinerating plant. The conveying of the liquors representing the mixed flows is by the intermediary of tankers 30. The mixture of the liquors or waters is here at the sewage station loaded into the tanker 30 and driven to the site of the refuse incinerating plant. The ammonia expelling unit 3 is installed at the refuse incinerating unit and the expelled ammonia gas is fed into the heating boiler. Then the highly basic water containing a large portion of suspended material is fed into the flue gas scrubber 23. This design of the plant system would seem to be the most economic one to produce and is simplest to install later on.

Figure 5:
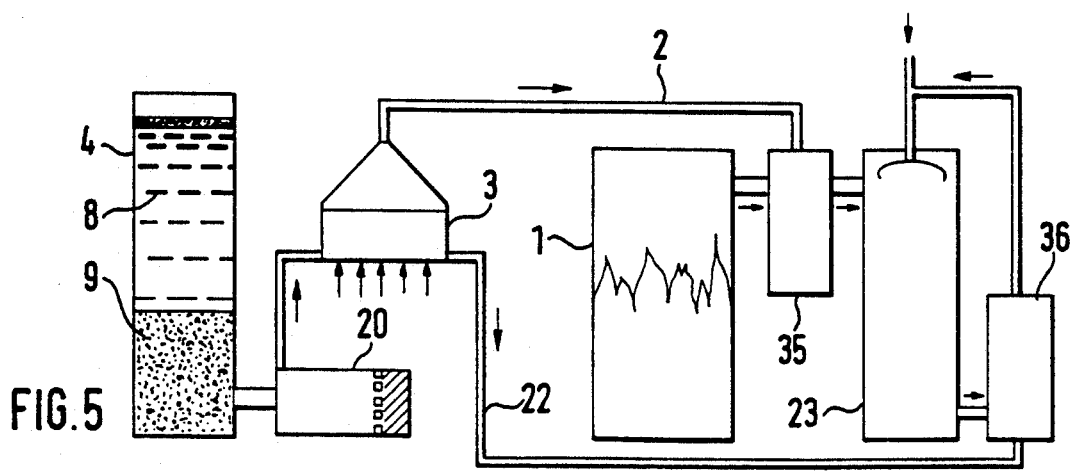

FIG. 5 shows a further modification of the method. In order to ensure that the quantity of water is not excessive the ammonia is only taken from the water extracted on dewatering the sludge and in this embodiment of the invention is fed into a postcombustion chamber 35, whose temperature is still sufficiently high for the conversion of the nitrogen oxides.

The scrubbing water is firstly brought to a pH value of 6 and then reacts with sufficient hydrochloric acid in the flue gas scrubber 23. So charged, the spent scrubbing water is fed to a neutralizing unit 36, which on the other hand is fed with water coming from the dewatering unit 20, which has been extracted from the sludge and contains a large quantity of $Ca(OH)_2$, possibly mixed with supernatant water 8, which has already been largely freed of ammonia in the ammonia expelling unit 3. It is only here that neutralization occurs, following which there is a recycling of the water into the flue gas scrubber 23.

It is generally the case that communal refuse has a requirement for $NH_3$ for dealing with $NO_x$, which corresponds approximately to the quantity of $NH_3$ from sewage abatement in the same town. The addition of basic lime for sludge treatment is generally greater than the requirement for refuse incineration. In the case of the latter there is then therefore no need to buy in additional material from outside sources.

I claim:

1. A process of flue gas abatement for a process of combustion, particularly of a refuse incinerating plant, in the case of which process ammonia and/or ammonium ions in a gaseous form or dissolved in water are supplied to the process of combustion or to hot flue gases therefrom, characterized in that such ammonia is taken from partial streams from the sludge treatment in a sludge treatment unit in a communal sewage plant.

2. The process as claimed in claim 1, characterized in that at least part of such partial streams of material in sludge treatment is taken from supernatant water in a sludge digesting tower.

3. The process as claimed in claim 1 or in claim 2, characterized in that as the partial streams from the sludge treatment, use is made at least in part of separated water, which is produced during concentration of digested sludge.

4. The process as claimed in claim 1, in which furthermore acidic components are removed from the flue gasses by scrubbing and are neutralized with basic materials, to which milk of lime has been added, characterized in that such basic materials consist at least in part of materials from partial streams of a sludge treatment unit in a communal sewage plant, to which streams milk of lime have been added.

5. The process as claimed in claim 4, characterized in that sewage containing 1 to 5% sludge is utilized.

6. The process as claimed in claim 4 or claim 5, characterized in that the basic material is added to the refuse to be incinerated.

7. The process as claimed in claim 4, characterized in that dewatered sewage sludge, which has been treated with milk of lime, is at least in part utilized as the basic material.

* * * * *